W. H. BALDWIN.
TRACTOR LAWN MOWER.
APPLICATION FILED MAY 13, 1919.
1,417,485.
Patented May 30, 1922.
5 SHEETS—SHEET 5.
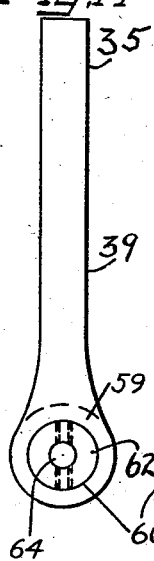
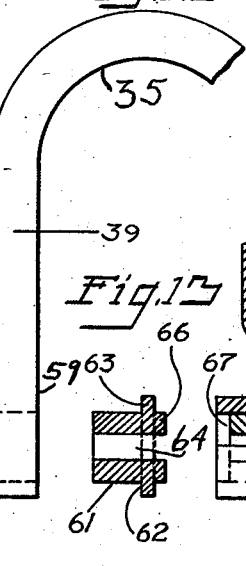
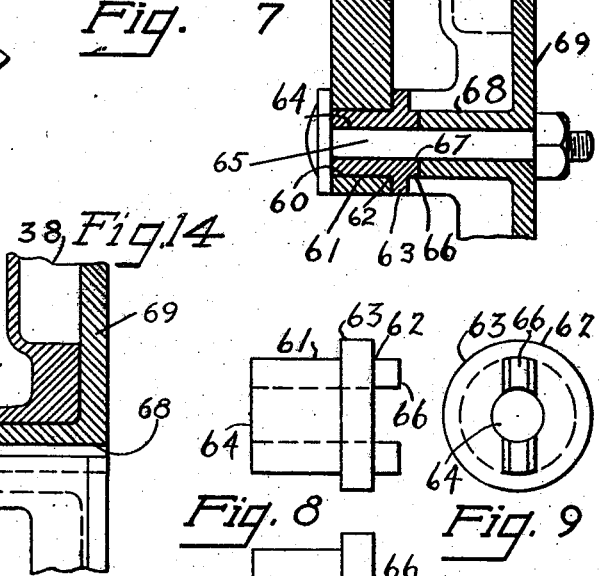
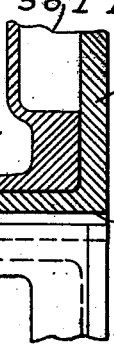
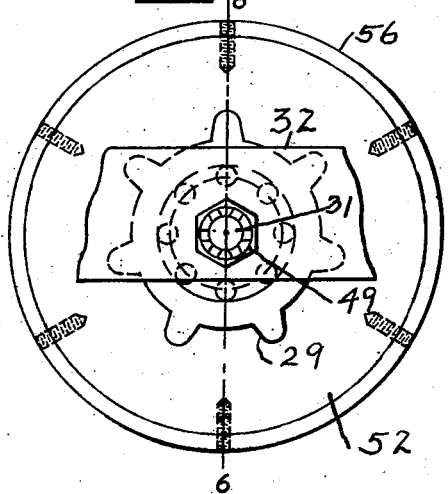
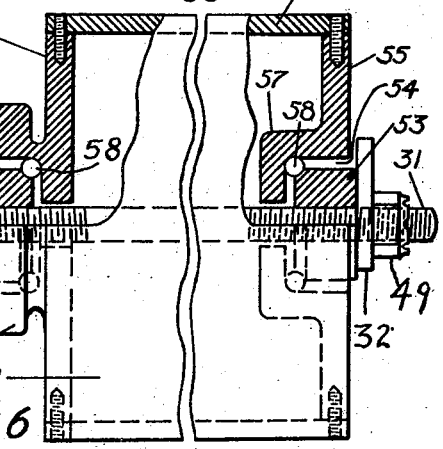
Inventor
WILLIAM HALL BALDWIN
By Louis M. Schmidt
Attorney

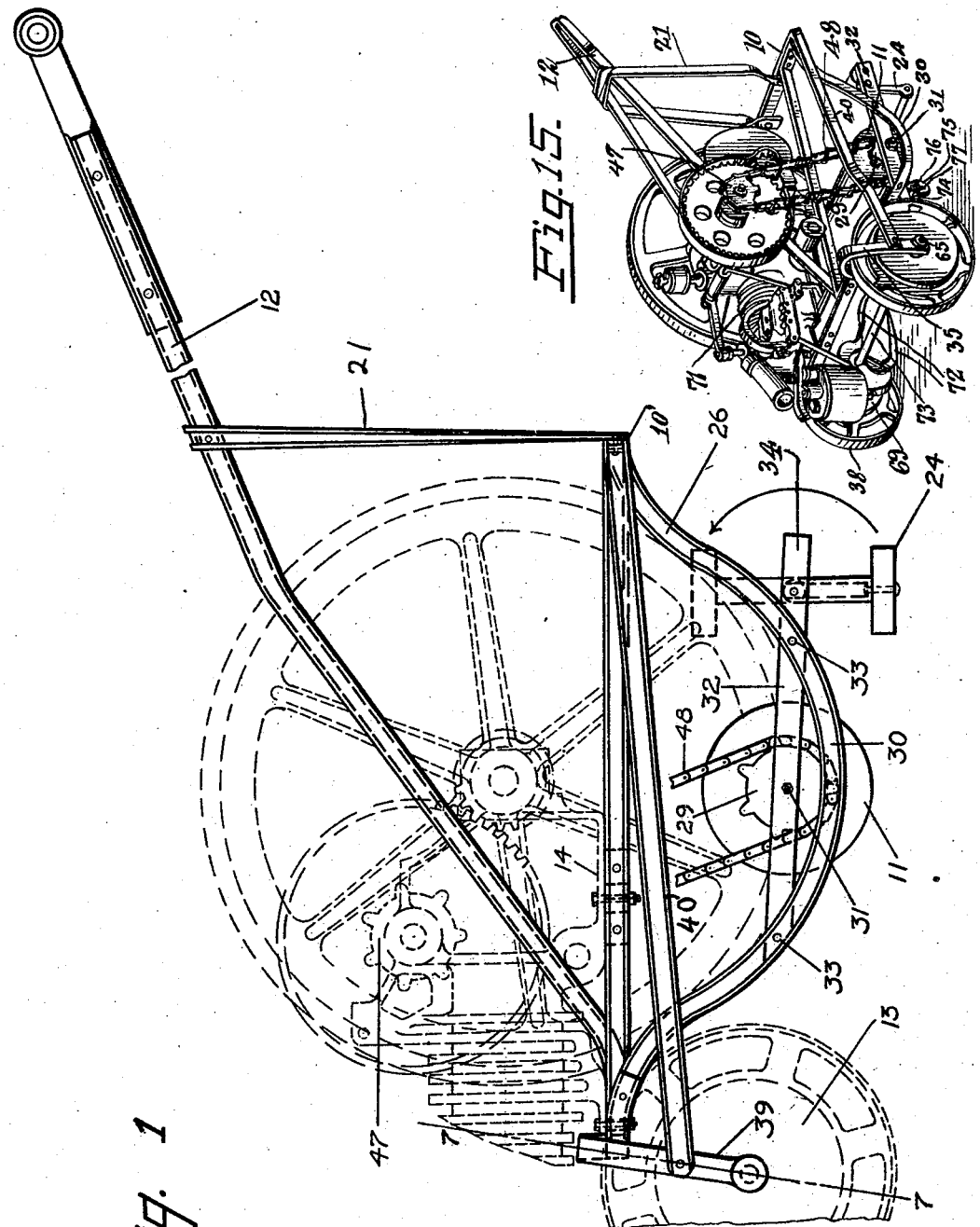

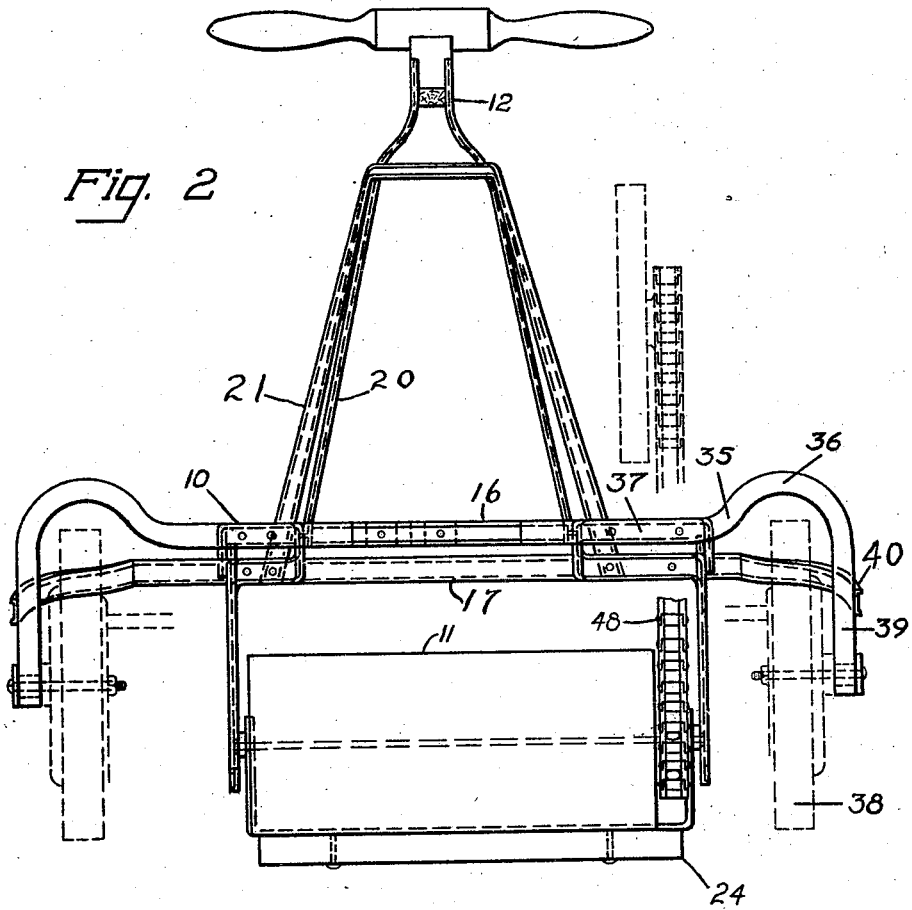

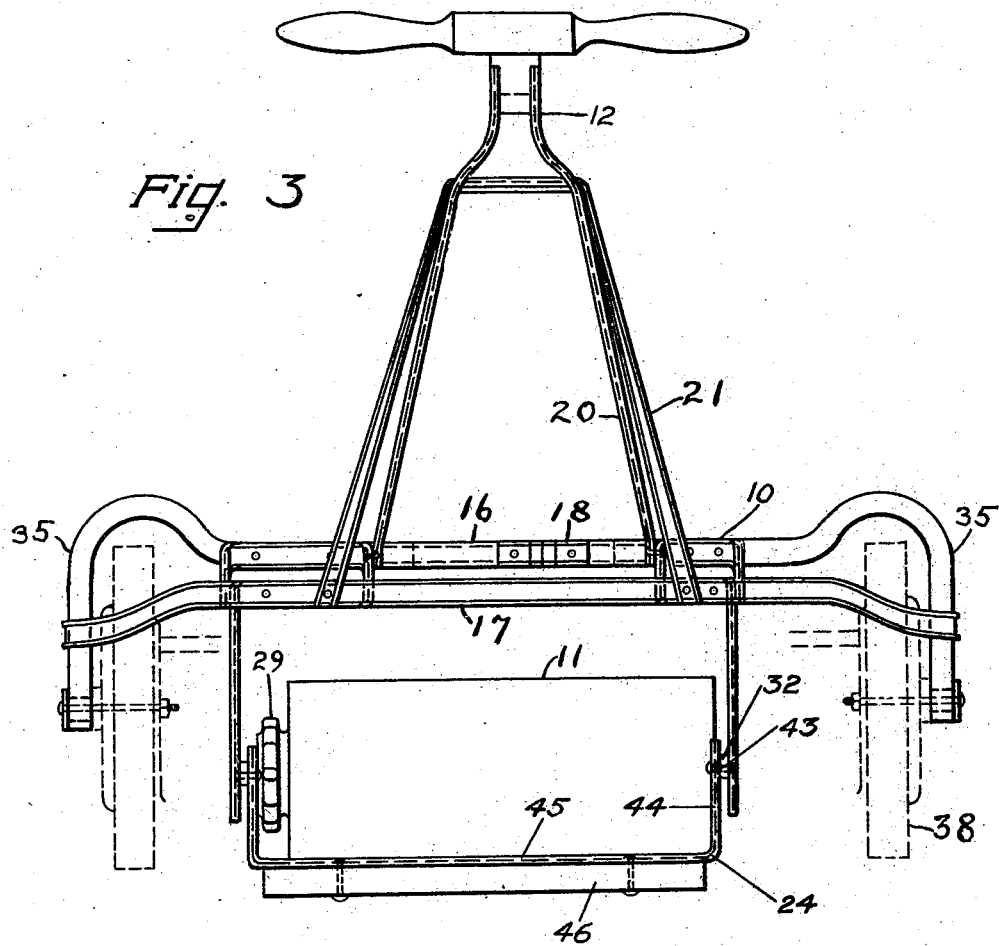

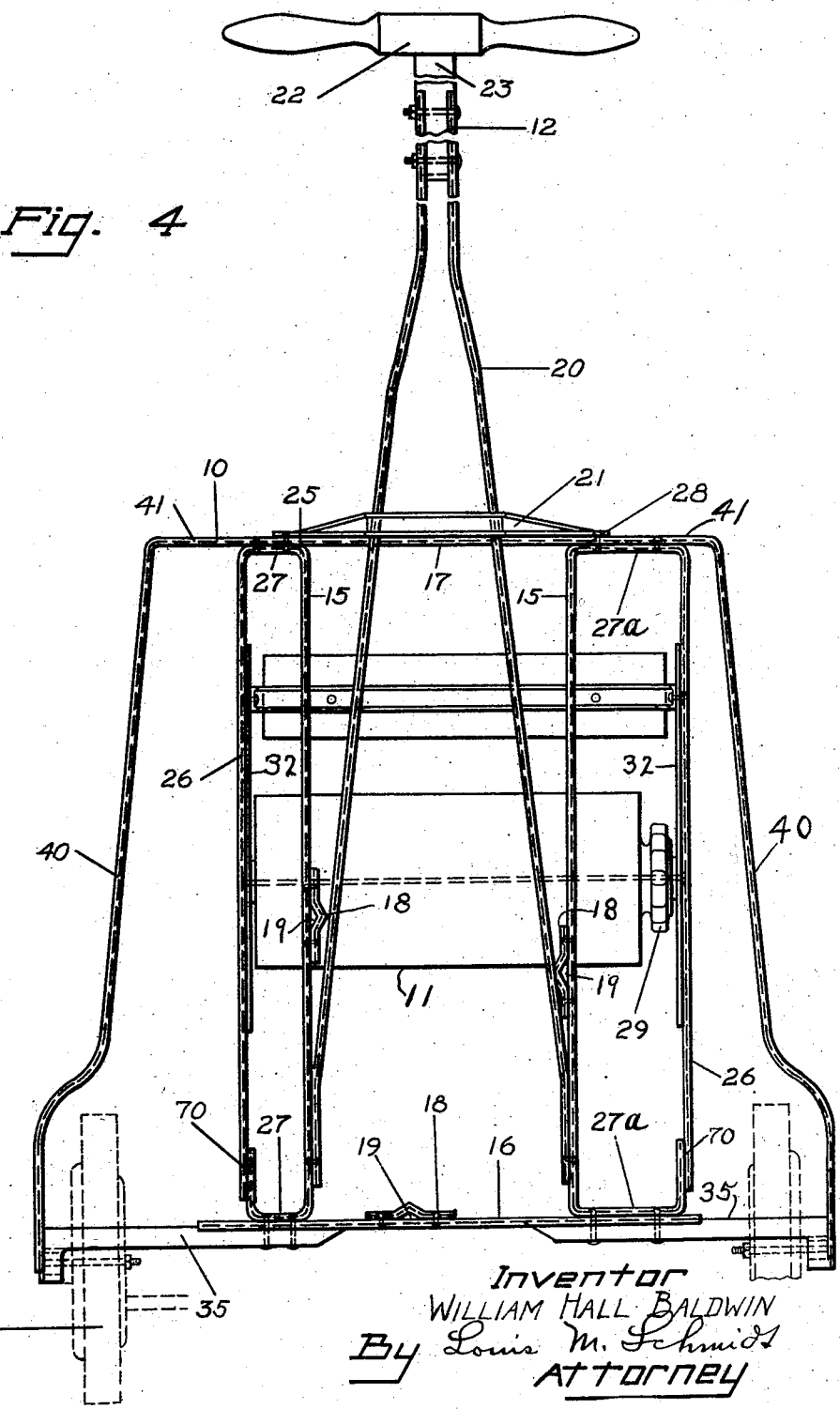

UNITED STATES PATENT OFFICE.

WILLIAM HALL BALDWIN, OF MIDDLETOWN, CONNECTICUT.

TRACTOR LAWN MOWER.

1,417,485.  Specification of Letters Patent.  Patented May 30, 1922.

Application filed May 13, 1919. Serial No. 296,826.

*To all whom it may concern:*

Be it known that I, WILLIAM HALL BALDWIN, a citizen of the United States, residing at Middletown, in the county of Middlesex and State of Connecticut, have invented certain new and useful Improvements in Tractor Lawn Mowers, of which the following is a specification.

My invention relates to improvements in tractor lawn mowers, and the object of my improvement is to produce a tractor device comprising a frame and a tractor roll operatively supported in the said frame that is adapted to receive and support an internal-combustion engine for driving the said roll and to be operatively connected to a lawn mower structure of ordinary form so as to operate the cutting blades when the tractor roll is driven by the engine, and which tractor device is of simple form, is relatively light, can be built at moderate cost, and is convenient and efficient in use, the device being related to that shown and described in my companion application filed November 12, 1919, Serial No. 337,385.

In the accompanying drawing:—

Figure 1 is a side elevation of my improved tractor device and a lawn mower connected thereto, the bed plate and driving sprocket gear of an internal-combustion engine that is adapted to be mounted on the said device being shown in broken lines.

Figure 2 is a front elevation of the tractor device shown in Fig. 1.

Figure 3 is a rear elevation of the same.

Figure 4 is a plan view of the same.

Figure 5 is a side elevation, on an enlarged scale, of the end of the tractor roll and adjacent parts.

Figure 6 is a sectional view on the line 6—6 of Fig. 5.

Figure 7 is a fragmentary sectional view on the line 7—7 of Fig. 1.

Figure 8 is a side elevation of the bearing device shown in section in Fig. 7.

Figure 9 is an end elevation of the same.

Figure 10 is a plan view of the bearing device shown in Fig. 8.

Figure 11 is a side elevation of the connecting bar for the lawn mower connection shown in Fig. 7, being on the same scale as the said Fig. 7, the bearing device or adapter being shown in position in the hub portion thereof.

Figure 12 is a front elevation of the connecting bar shown in Fig. 11.

Figure 13 is a sectional view of the bearing device or adapter alone.

Figure 14 is a fragmentary sectional view showing part of the frame and part of the driving wheel of the lawn mower.

Figure 15 is a perspective view, on a reduced scale, of the complete device.

My improved tractor device comprises a frame 10 and a tractor roll 11 incorporated in a unitary structure, the said frame being provided with a rearwardly extending handle 12, having the front end portion connected to the lawn mower 13, and being adapted to receive and support the internal-combustion engine, as by means of the engine bed 14 resting on a portion of the frame.

The engine support comprises a part of the frame of rectangular form, composed of two longitudinally directed side members 15 that are cross-connected at the front ends by a front cross-piece 16 and at the rear ends by the rear cross-piece 17, a plurality of bolt straps 18 being provided at suitable positions to provide openings 19 for bolts for securing the engine bed 14 in place.

The handle 12 is composed of a pair of upwardly and rearwardly directed handle sides 20 that are connected directly by the front ends with the side members 15, that have the rear portion connected to the rear cross-piece 17 indirectly by means of the U-shaped brace 21, and have the extreme rear ends connected through the medium of the structure of the handle proper 22, the stem 23 of the said handle proper 22 being interposed between the said extreme rear ends.

The side members 15 are each the inner side of a closed loop of peculiar form the outer member or side of which drops downwardly below the level of the engine bed support so as to provide means for connecting the frame 10 with the roll 11 and also with the swinging stand 24 that is provided for supporting the roll 11 in non-driving position.

Thus the right hand closed loop 25 is composed of the side member 15 on the inner side, the outer member 26 on the outer side, and the two end members 27 at the ends, the said end members 27 being each opposed to and secured to one of the cross-pieces 16 and 17.

The left hand closed loop 28 is generally similar to the right hand closed loop 25 and differs therefrom in having a greater lateral spacing of the sides 15 and 26, the ends 27ª being correspondingly longer than the ends 27, to provide for housing the sprocket gear 29 that is positioned at the left end of the roll 11.

The outer members 26 are generally of shallow U-shape, the bottom portion 30 extending appreciably below the level of the shaft 31 of the roll 11.

The actual support for the roll 11 and the stand 24 is provided by means of a pair of side straps 32 that are secured to the bottom portions 30, one on each side. The said straps 32 extend each in the position of a horizontal chord across the curved bottom portion 30 and are secured thereto at the intersections therewith, the roll shaft 31 being connected to the portion of the strap 32 that is between the intersections 33 with the bottom portion 30, and the stand 24 being mounted on rearward extensions 34 of the said straps 32.

The lawn mower connection of the frame 10 is in the form of a pair of bars 35 of special form that extend outwardly, one at each side, from the ends of the front cross-piece 16, have upwardly directed curved portions 36 adjacent the junctions 37 with the said cross-piece 16 for providing clearance for the driving wheel 38 of the lawn mower, and have the outer portions 39 in the form of a downwardly directed arm that is provided at the lower end with means to be described for connecting with the lawn mower.

As braces for the lawn mower connecting bars 35 I provide a pair of brace members 40, one on each side, connected in each case with the arm 39 by the front end and having the rear end connected to a lateral extension 41 of the rear cross-piece 17.

The stand 24 is composed of a U-shaped strap that is pivotally supported by pins 43 from the chord strap 32 by the end or side arm portions 44 and has secured to the middle, cross-connecting portion 45 a piece of board 46 of suitable form for contacting with the ground when in use.

The sprocket gear 29 of the roll 11 is operatively connected with a sprocket gear 47 of the engine by means of a sprocket chain 48.

The roll shaft 31 is secured to the side straps 32 by means of a lock nut 49 on the outer side of the strap and one of the inner cone members of ball bearing structures that are screwed on the threaded end portion of the shaft and positioned on the inner side of the side strap. The cone member 50 on the left side is housed within a recess 51 that is provided in the head structure 52 at the left end of the roll 11 and the right cone member 53 is housed in a recess 54 in the right head structure 55 thereof.

The cylindrical body portion 56 of the roll 11 is in the form of a tube that is closed at the ends by the head structures 52 and 55. The recess 54 at the right side is formed in a re-entrant portion 57 of the head structure 55 so that the side strap 32 is positioned quite close to the outer face of opposed head structure 55. The raceways for the balls 58 are provided in the corner of the recess 54 and the opposed corner of the cone member 53.

The head structure 52 differs from that described in that the sprocket gear 29 is incorporated in the structure thereof and overhangs the outer face thereof, and the recess 51 is generally enclosed by the structure of the said sprocket gear 29.

The connection of the lawn mower with the arm 39 is provided in the following manner:—The arm 39 has at the lower end a hub portion 59 that has an opening 60 that serves as a bearing in cooperation with the bearing portion 61 that is provided on a bearing member 62 that serves as an adapter for connecting with the lawn mower and is of proper form to correspond to the particular form of lawn mower that is used.

The adapter 62 shown is suitable for connecting with a lawn mower of standard form and comprises a cylindrical bearing portion 61, as mentioned, for extending through the opening 60, has an annular flange 63 at the inner end of the said bearing portion 61, has an axial bore 64 for the clamping bolt 65, and has on the inner face, extending inwardly from the flange 63, projections 66 that fit in recesses 67 in the opposed end of the bearing boss 68 of the frame 69 of the lawn mower.

Except for the provision of the bearing portion 61 on the outer side and a corresponding increase in the length of the clamping bolt 65 the adapter 62 and the adjacent parts of the lawn mower, as shown, correspond to structures found in lawn mowers of the form mentioned. Thus the bearing boss 68 serves as the bearing for the lawn mower driving wheel 38.

The clamping bolt 65 serves to clamp the bearing 61 to the frame 69 of the lawn mower.

The lawn mower connecting bars 35 are made of solid bar stock and the chord straps 32 are made of solid strap material and all of the other parts of the frame 10 are formed of channel iron.

The closed loops 25 and 28 are each formed of a single piece of material having ends overlapping on the outer sides and joined together, as shown at 70.

The two side braces 40 and the rear cross-piece 17 are formed of one piece of material of generally U-shape.

The handle 12 is so positioned that the entire structure can be tilted with the roll as a fulcrum so as to lift the lawn mower off from the ground or can be lifted, using the lawn mower wheels as a fulcrum, so as to raise the roll off from the ground, and interrupting the operation to a corresponding extent in each case, the operation being thus readily controlled by the operator.

The following features will be noted in the construction described:—The engine frame or bed is supported by the roll and the lawn mower driving wheels; the propulsion is effected from the engine through the medium of the roll and the cutters or knives are driven from the lawn mower driving wheels, as in the hand operated lawn mower; the rear portion of the frame is supported by the ends of the shaft for the roll; the front portion of the frame is supported by means of two outside arms, each of which is opposed to the outer face of one of the lawn mower driving wheels; each of the said outside arms is rigidly incorporated with the adjacent side frame structure of the lawn mower; the use of the curved loops for connecting the outside arms with the engine bed frame serves to permit of dropping the said engine bed frame below the tops of the lawn mower driving wheels, so that the elevation is independent of the diameter of such wheels, and is determined only by the diameter of the roll, the lawn mower wheels, as shown, being of nearly twice the diameter of the roll; no structural change in the lawn mower over that for hand operation is involved; and the details of the construction of the roll, as shown in Fig. 6, permit of a compact and efficient arrangement of the parts.

Considering the complete device, as shown in the perspective view in Fig. 15, it will be noted that the engine, designated as a whole by the character 71, is supported by the main frame 10, and the lawn mower, designated as a whole by the character 13, is connected to the front end portion of the said main frame 10. The lawn mower 13 comprises a lawn mower frame of the usual skeleton form of construction, having a pair of side plates 69, shown also in Figs. 7 and 14, in spaced relation and cross-connected at the front by the cross-bar 73, and which lawn mower frame is operatively supported by the lawn mower driving wheels 38 at the front end portion and the wooden trailer roll 74 at the rear end portion.

The lawn mower driving wheels 38 are operatively connected to the lawn mower side plates 69 by means of the connecting bolts 65, which bolts 65 also serve as the means for operatively connecting the lawn mower 13 with the main frame 10, through the medium of the curved arm portions 35.

The wooden trailer roll 74 is connected at each end to an arm 75 that extends rearwardly from the lawn mower side plate 69 by means of a stub shaft structure 76 that is secured in a slot 77 in the said arm 75, which slot 77 permits of adjustment to correspond to the closeness of the cut of the grass that may be desired. Shifting the stub shaft structure 76 in the slot 77 serves to tilt the arm 75 relatively to the base as determined by the contact with the ground of the lawn mower driving wheels 38 and the wooden trailer roll 74 and serves to change to correspond the position of the cutting blades 72 and the said blades 72 are operatively supported from the side plate structures 69 intermediate the slots 77 and the connecting bolts 65, as is usual.

The connecting bolts 65, positioned at the axes of the lawn mower driving wheels 38, serve as the driving means for the lawn mower 13 intermediate the engine or motor 71 and the said lawn mower 13, comprising the operative connecting means between these parts.

I claim as my invention:—

1. A tractor lawn mower device comprising a frame, a motor supported on the upper side of the said frame, a tractor driving roll connected to the said frame, positioned on the under side of the rear portion thereof, and operatively connected to the said motor, the front portion of the said frame being provided with means for being connected to a lawn mower, and the parts being constructed and arranged so that the front part of the said frame will be supported by means of the said connection of the frame with the lawn mower and that the lawn mower will be operatively driven through the medium of such connection.

2. A lawn mower tractor device comprising a frame having the body portion in the form of a skeleton platform for receiving and supporting a motor, a tractor driving roll operatively connected to the said motor serving to support the rear end portion of the said frame and to operate as the driving means for the said device, and the front end portion of the said frame being provided with means for connection with a lawn mower structure for supporting the said front end portion and for permitting the said structure to be driven by the said device.

3. A lawn mower tractor device as described in claim 2 and a stand structure also supported by the said frame.

4. A main frame for a tractor lawn mower device comprising an engine bed portion, a pair of laterally directed arms at the front end of the said engine bed portion provided with means for being connected with a lawn mower, and a pair of side structures positioned one on each side of the said engine bed portion, connected by the front ends to the said arms and by the rear ends to the said engine bed portion, and the said side structures being depressed relatively to the said engine bed portion and provided with means for operatively connecting with the ends of a tractor roll, whereby the said roll will be operatively housed under the said engine bed portion.

5. A tractor lawn mower device comprising a propelling device consisting of a main frame provided with a tractor roll and a motor, and the said main frame being constructed and arranged so that connection can be made with a lawn mower structure for driving the said structure, and with the weight of the device distributed so as to be supported at the rear end portion by the said roll and at the front end portion by the driving wheels of the lawn mower structure.

6. A tractor lawn mower device having a frame for supporting a motor, for connection with a tractor roll, and for connection with a lawn mower, the said frame having a platform portion for receiving the motor and lateral arms that serve to connect the said platform on each side with the part of the lawn mower opposed to and adjacent the outer faces of the lawn mower driving wheels, and the said lateral arms being of curved form for extending over the said driving wheels, so that with a relatively large driving wheel the platform can be positioned at a lower level than the top of the periphery of the said driving wheel and with the said arm positioned generally in an approximately vertical plane.

7. In combination in a lawn mower tractor device, a frame, an engine supported by the said frame, a lawn mower structure connected to one part of the said frame, and a tractor roll connected to another part of the said frame, a ball bearing structure being interposed between each of the end portions of the said roll and the opposed portion of the frame, the said roll having a driving gear at one end and having a roll body that is provided with head structures at the two ends, the said head structure at one end being incorporated as a unitary structure with the said driving gear, and the said head structures being each provided with a re-entrant portion that serves as a part of one of the said ball bearing structures.

8. A tractor lawn mower comprising an engine, a tractor roll driven by the said engine, and a lawn mower structure propelled by the said roll, the lawn mower structure having a pair of driving wheels and having a lawn mower frame, the said frame having shaft devices that extend from the inner side outwardly through the said driving wheels, a main frame for supporting the said engine, the said main frame being in the form of a rigid structure, having the rear end portion connected to the said roll, and having the front end portion connected on each side to the outer end portions of the said shaft devices.

9. In a tractor lawn mower combination, a frame having a bed for the engine, a tractor roll extended across the said bed, on the under side of the rear end thereof, a pair of lawn mower driving wheels connected to the front end portion of the said frame, and the said bed being depressed in elevation relatively to the upper sides of the said lawn mower driving wheels.

10. In a tractor lawn mower, a frame having a bed for receiving and supporting the engine, a tractor driving roll supporting the rear end portion of the said frame and a lawn mower structure serving to support the front end portion of the said frame, through the medium of a pair of driving wheels, the said bed being in the form of a skeleton platform structure and being extended over the said roll, and the said frame being provided with means for connecting with the said lawn mower in the form of a pair of lateral arms, each of which arms has an upwardly directed curved portion for extending over the said driving wheels.

WILLIAM HALL BALDWIN.